(12) United States Patent
Shirai

(10) Patent No.: US 9,956,630 B2
(45) Date of Patent: May 1, 2018

(54) WIRE ELECTRIC DISCHARGE MACHINE HAVING ERRONEOUS MACHINING PREVENTING FUNCTION

(71) Applicant: FANUC Corporation, Yamanashi (JP)

(72) Inventor: Kenichiro Shirai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 233 days.

(21) Appl. No.: 14/810,536

(22) Filed: Jul. 28, 2015

(65) Prior Publication Data

US 2016/0031025 A1 Feb. 4, 2016

(30) Foreign Application Priority Data

Jul. 30, 2014 (JP) ................................. 2014-154973

(51) Int. Cl.
| B23H 1/02 | (2006.01) |
| B23H 7/02 | (2006.01) |
| B23H 7/06 | (2006.01) |
| G05B 19/4061 | (2006.01) |

(52) U.S. Cl.
CPC ............... *B23H 1/024* (2013.01); *B23H 7/02* (2013.01); *B23H 7/06* (2013.01); *G05B 19/4061* (2013.01); *G05B 2219/45043* (2013.01)

(58) Field of Classification Search
CPC . B23H 1/024; B23H 7/02; B23H 7/06; B23H 7/065; G05B 19/4061; G05B 2219/45043
See application file for complete search history.

(56) References Cited

U.S. PATENT DOCUMENTS

| 2001/0012973 A1 | 8/2001 | Wehrli et al. |
| 2003/0042228 A1 | 3/2003 | Arakawa |
| 2009/0240482 A1 | 9/2009 | Naganawa |
| 2012/0089247 A1 | 4/2012 | Kawauchi et al. |

FOREIGN PATENT DOCUMENTS

| JP | 60-213423 A |   | 10/1985 |
| JP | 63-134124 A | * | 6/1988 |
| JP | 02-180539 A | * | 7/1990 |
| JP | 9-212229 A |   | 8/1997 |
| JP | 10-156628 A |   | 6/1998 |
| JP | 11-165239 A |   | 6/1999 |
| JP | 2003-71636 A |  | 3/2003 |
| JP | 2003-291033 A | | 10/2003 |
| JP | 2004-145744 A | | 5/2004 |
| JP | 2004-202627 A | | 7/2004 |
| JP | 2007-18145 A |  | 1/2007 |
| JP | 2009-230571 A | | 10/2009 |

OTHER PUBLICATIONS

Decision to Grant a Patent in JP Application No. 2014-154973, dated Jun. 28, 2016.

* cited by examiner

*Primary Examiner* — Geoffrey S Evans
(74) *Attorney, Agent, or Firm* — Hauptman Ham, LLP

(57) ABSTRACT

A wire electric discharge machine performs electric discharge machining on a workpiece by relatively moving a workpiece placed on a workpiece table and a wire electrode supported by upper and lower wire guides according to a machining program. The wire electric discharge machine comprises an interference determination unit configured to determine whether or not the top or bottom surface of the workpiece table interferes with the wire electrode at the height of the surface during the execution of the machining program.

17 Claims, 12 Drawing Sheets ered to as an X-axis stroke limit 33, Y-axis stroke limit 34, U-axis stroke limit 35, and V-axis stroke limit 36, respectively.

FIGS. 12A and 12B are diagrams illustrating problems of the conventional stroke limit setting method shown in FIG. 11.

The U-axis stroke limit 35 and the V-axis stroke limit 36 are named generically as a UV-axis stroke limit 40. Likewise, the X-axis stroke limit 33 and the Y-axis stroke limit 34 are named generically as an XY-axis stroke limit 41. The distance between an upper guide plane 37 and a lower guide plane 38 is referred to as a guide-to-guide distance 42. A program surface 39 and a sub-program surface 47 are used as a reference for the creation of machining programs.

The stroke limits designate movable regions of the upper and lower guide planes 37 and 38. Specifically, the lower guide plane 38 is the maximum movable range of the lower nozzle 31 or the workpiece table 7 that is allowed in view of the machine configuration. On the other hand, the upper guide plane 37 is the maximum movable range of the upper nozzle 30 that is allowed in view of the machine configuration.

In taper machining, the operating range of the wire electrode 32 varies depending on the program surface height, workpiece thickness, guide-to-guide distance, and taper angle. Possibly, therefore, the workpiece table 7 and/or the jig 6 may be erroneously machined during electric discharge machining in spite of care (see FIG. 12A). In the case of machining with the upper nozzle 30 inclined to the left of FIG. 12A with respect to the lower nozzle 31, the wire electrode 32 interferes with neither the jig 6 nor the workpiece table 7. In the case of machining with the upper nozzle 30 inclined to the right of FIG. 12A with respect to the lower nozzle 31, in contrast, the wire electrode 32 and the jig 6 may possibly interfere with each other although the upper and lower nozzles 30 and 31 are located within the UV-axis and XY-axis stroke limits 40 and 41, respectively.

In some cases, moreover, a prohibited area may be established even in a range in which there is no interference during taper machining within the stroke limits, so that the operating range of the machine that is originally available for machining may fail to be used effectively (see FIG. 12B). Even when the lower nozzle 31 is moved further to the left of the XY-axis stroke limit 41, the wire electrode 32 interferes with neither the jig 6 nor the workpiece table 7. Thus, there is a problem that the operating range of the machine cannot be used effectively if the interference of the wire electrode 32 with the jig 6 or the workpiece table 7 within the stroke limits is checked based only on comparison with the stroke limits.

WIRE ELECTRIC DISCHARGE MACHINE HAVING ERRONEOUS MACHINING PREVENTING FUNCTION

RELATED APPLICATIONS

The present application claims priority to Japanese Application Number 2014-154973, filed Jul. 30, 2014, the disclosure of which is hereby incorporated by reference herein in its entirety.

BACKGROUND OF THE INVENTION

Field of the Invention

The present invention relates to a wire electric discharge machine, and more particularly, to a wire electric discharge machine having an erroneous machining preventing function.

Description of the Related Art

In a wire electric discharge machine, a wire electrode is stretched and driven between upper and lower wire guides, and electric discharge machining is performed by applying voltage between the wire electrode and a workpiece disposed between the upper and lower wire guides (see Japanese Patent Application Laid-Open No. 2003-71636).

FIG. 11 is a diagram showing how stroke limits are set so that upper and lower nozzles do not interfere (or collide) with a workpiece table, jig, or wall surfaces of a machining tank, in a wire electric discharge machine. A workpiece 5 is placed on a workpiece table 7 and secured to the table 7 by a jig 6. The workpiece table 7 is moved within a plane defined by X- and Y-axes by driving means (not shown).

An upper nozzle 30 and a lower nozzle 31 are disposed apart from each other above and below the workpiece table 7. An upper guide (not shown) supporting a wire electrode 32 is mounted in the upper nozzle 30. A lower guide (not shown) supporting the wire electrode is mounted in the lower nozzle 31. U-axis extends in the same direction as the X-axis, while V-axis extends in the same direction as the Y-axis. The upper nozzle 30 moves within a plane (upper guide plane) defined by the U- and V-axes and extending parallel to the plane defined by the X- and Y-axes. The upper nozzle 30 (upper guide) can move in the direction of Z-axis perpendicular to the plane defined by the X- and Y-axes (plane defined by the U- and V-axes). If the lower nozzle 31 moves, it moves within a lower guide plane parallel to the plane defined by the X- and Y-axes.

In the wire electric discharge machine, the wire electrode 32 performs electric discharge machining in such a manner that it is run between the upper guide in the upper nozzle 30 and the lower guide in the lower nozzle 31, or the workpiece table 7 and the upper nozzle 30 are moved relative to the wire electrode 32, or the upper nozzle 30 is moved in the U- and V-axis directions. The wire electric discharge machine can perform workpiece tapering with the use of driving means for the X- and Y-axis directions and driving means for the U- and V-axis directions.

In the wire electric discharge machine, the stroke limits are set so that the upper and lower nozzles 30 and 31 do not interfere (or collide) with the workpiece table 7, the jig 6, or machining tank wall surfaces 9. The stroke limits individually set for the X-, Y-, U-, and V-axis directions will be

SUMMARY OF THE INVENTION

Accordingly, in view of the above-described problems of the prior art, the present invention has an object to provide a wire electric discharge machine capable of checking, during electric discharge machining, to see if there is interference (or collision) between a wire electrode and a workpiece table or a jig for securing a workpiece to the workpiece table, thereby preventing erroneous machining and effectively using its operating range.

Another object of the present invention is to provide an arithmetic device capable of virtually executing a machining program for a wire electric discharge machine and checking to see if there is interference (or collision) between a wire electrode and a workpiece table or a jig for securing a workpiece to the workpiece table, thereby effectively using the operating range of the wire electric discharge machine.

A wire electric discharge machine according to the present invention performs electric discharge machining on a workpiece by relatively moving the workpiece placed on a workpiece table and a wire electrode supported by upper and lower wire guides according to a machining program. The wire electric discharge machine comprises an interference determination unit configured to determine whether or not the top or bottom surface of the workpiece table interferes with the wire electrode at the height of the surface during the execution of the machining program.

The interference determination unit may comprise a wire electrode position calculation section configured to calculate a position of the wire electrode on a plane at the height of the surface to be checked for interference with the wire electrode.

The wire electric discharge machine may further comprise a jig configured to secure the workpiece to the workpiece table, and the interference determination unit may be configured to determine whether or not the top or bottom surface of the jig, in addition to the top or bottom surface of the workpiece table, interferes with the wire electrode at the height of the surface during the execution of the machining program.

The interference determination unit may comprise a selection section configured to select one of the surfaces to be checked for interference with the wire electrode.

The wire electric discharge machine may further comprise a setting unit configured to set a region and a thickness of the workpiece table.

The wire electric discharge machine may further comprise a distance output unit configured to output minimums of distances between the wire electrode and the workpiece table in four directions including positive and negative first directions and positive and negative second directions perpendicular to the first directions.

The wire electric discharge machine may further comprise a setting unit configured to set a region and a thickness of the jig for securing the workpiece to the workpiece table.

The wire electric discharge machine may further comprise a distance output unit configured to output minimums of distances from the wire electrode to the workpiece table and the jig in four directions including positive and negative first directions and positive and negative second directions perpendicular to the first directions.

An arithmetic device according to the present invention virtually executes a machining program for a wire electric discharge machine, which performs electric discharge machining on a workpiece by relatively moving the workpiece placed on a workpiece table and a wire electrode supported by upper and lower wire guides. The arithmetic device comprises an interference determination unit configured to determine whether or not the top or bottom surface of the workpiece table interferes with the wire electrode at the height of the surface during the virtual execution of the machining program.

The interference determination unit may comprise a wire electrode position calculation section configured to calculate a position of the wire electrode on a plane at the height of the surface to be checked for interference with the wire electrode.

The arithmetic device may further comprise a jig configured to secure the workpiece to the workpiece table, and the interference determination unit may be configured to determine whether or not the top or bottom surface of the jig, in addition to the top or bottom surface of the workpiece table, interferes with the wire electrode at the height of the surface during the virtual execution of the machining program.

The interference determination unit may comprise a selection section configured to select one of the surfaces to be checked for interference with the wire electrode.

The arithmetic device may further comprise a setting unit configured to set a region and a thickness of the workpiece table.

The arithmetic device may further comprise a distance output unit configured to output minimums of distances between the wire electrode and the workpiece table in four directions including positive and negative first directions and positive and negative second directions perpendicular to the first directions.

The arithmetic device may further comprise a setting unit configured to set a region and a thickness of the jig for securing the workpiece to the workpiece table.

The arithmetic device may further comprise a distance output unit configured to output minimums of distances from the wire electrode to the workpiece table and the jig in four directions including positive and negative first directions and positive and negative second directions perpendicular to the first directions.

According to the present invention, there can be provided a wire electric discharge machine capable of checking, during electric discharge machining, to see if there is interference (or collision) between a wire electrode and a workpiece table or a jig for securing a workpiece to the workpiece table, thereby preventing erroneous machining and effectively using its operating range.

According to the present invention, moreover, there can be provided an arithmetic device capable of virtually executing a machining program for a wire electric discharge machine and checking to see if there is interference (or collision) between a wire electrode and a workpiece table or a jig for securing a workpiece to the workpiece table, thereby effectively using the operating range of the machine.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
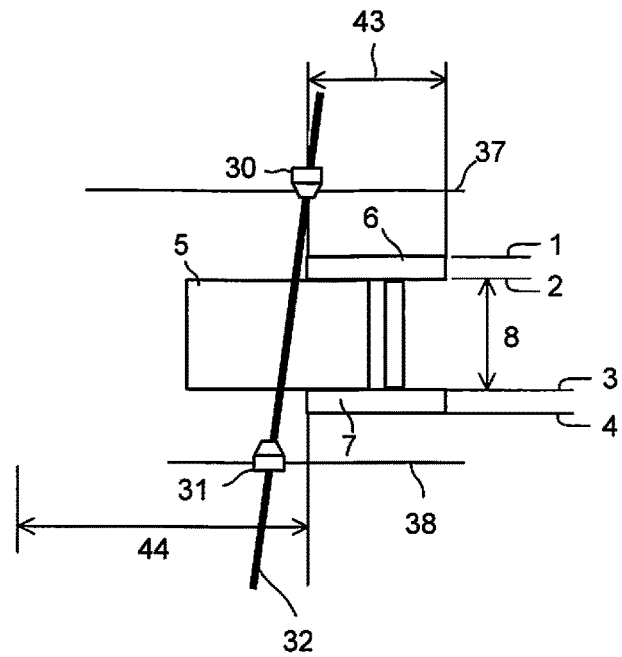
FIG. 1 is a diagram showing planes on which a limit check is made to prevent erroneous machining of a workpiece table and/or a jig during electric discharge machining.

An embodiment of the present invention will now be described with reference to the accompanying drawings. Like reference numerals are used to designate the same or similar configurations of the prior art and this embodiment.

First, a method for checking interference of a wire electrode with a jig or a workpiece table in a wire electric discharge machine according to the present invention will be described with reference to FIGS. 1, 2 and 3.

FIG. 1 is a diagram showing planes on which a limit check is made to prevent erroneous machining of the workpiece table and/or the jig during electric discharge machining.

Figure 11:
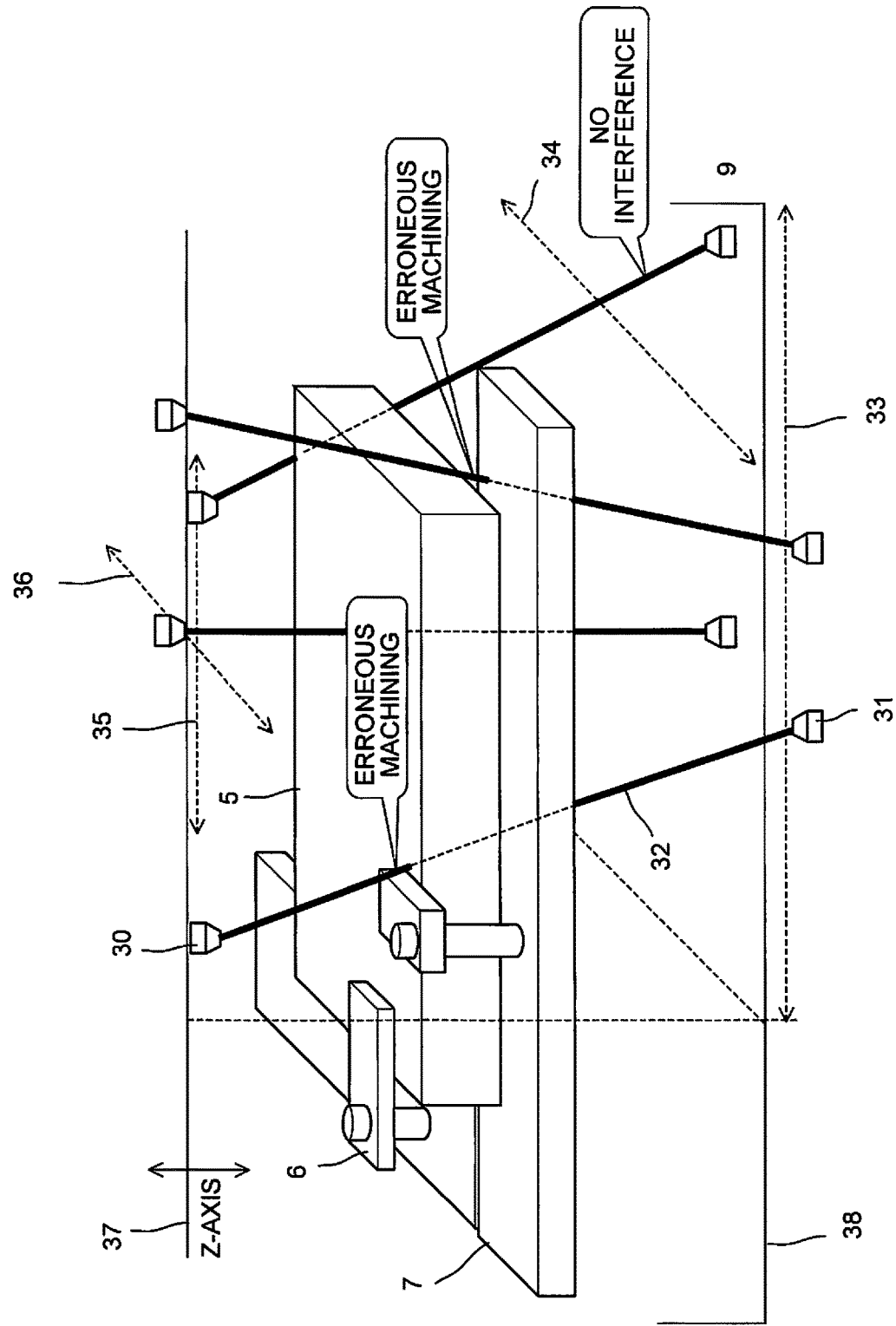
FIG. 11 is a diagram showing how stroke limits are set so that upper and lower nozzles do not interfere (or collide) with a workpiece table, jig, or wall surfaces of a machining tank, in a wire electric discharge machine.
Figure 12A:
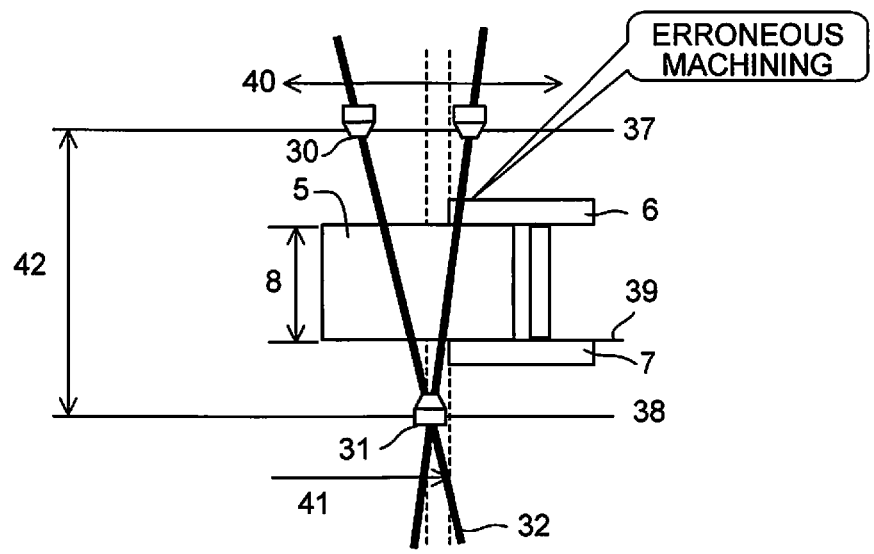
FIGS. 12A and 12B are diagram illustrating problems of the conventional stroke limit setting method shown in FIG. 11.
Figure 12B:
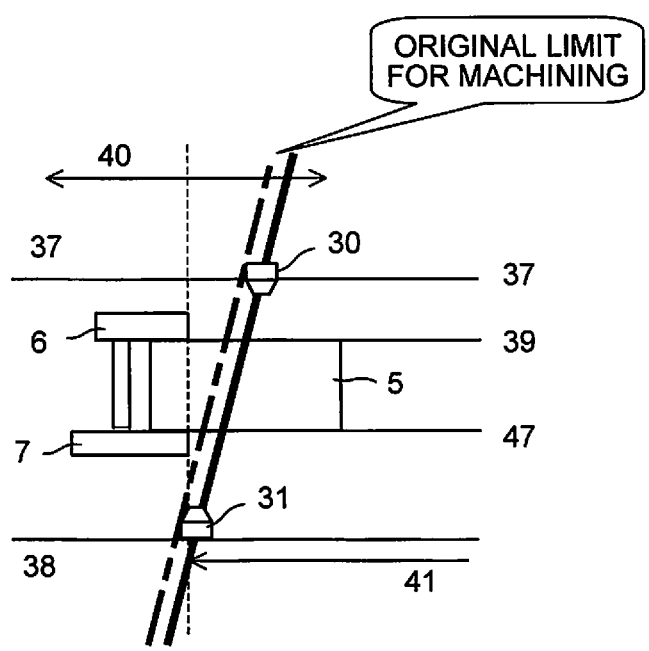

A workpiece 5 may be secured to a workpiece table 7 by using a jig configured to hold the workpiece 5 sideways, as well as by using the jig 6 shown in FIG. 11. Further, the workpiece 5 may be provided with a hole to which a bolt for fixing the workpiece table is attached. If the head portion of the bolt projects from the surface of the workpiece 5, its projecting part may be handled as the jig 6.

In the electric discharge machine according to the present invention, as shown in FIG. 1, interference with a wire electrode 32 is checked in each of regions including a jig top surface 1, jig bottom surface (workpiece top surface) 2, workpiece table top surface (workpiece bottom surface) 3, and workpiece table bottom surface 4, in addition to upper and lower guide planes 37 and 38. Specifically, erroneous machining of the workpiece table 7 and/or the jig 6 during the electric discharge machining is prevented by checking the interference of the wire electrode 32 with the jig 6 or the workpiece table 7, which may be caused as upper and lower nozzles 30 and 31 are moved relatively for taper machining.

According to the interference checking method described above, the interference check need not always be made for all the four surfaces, including the jig top surface 1, jig bottom surface 2, workpiece table top surface 3, and workpiece table bottom surface 4, depending on the machining conditions. In this case, the calculation load can be reduced by reducing the number of surfaces to be checked for interference. The case where the surfaces to be checked for interference (or collision) can be reduced will now be described with reference to FIG. 4.

Figure 4:
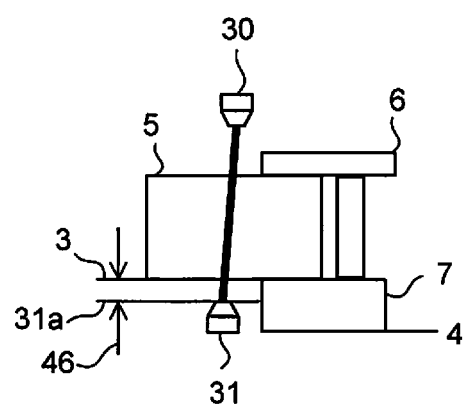
FIG. 4 is a diagram illustrating a case where the surfaces to be checked for interference (or collision) can be reduced.

Depending on the relative positions of the lower nozzle 31 and the workpiece table 7 in the height direction, the workpiece table top surface 3 and the workpiece table bottom surface 4 can be excluded from the group of surfaces to be checked for interference. In the case of FIG. 4, the height-direction position of the lower nozzle 31 is located above the bottom surface of the workpiece table 7 (workpiece table bottom surface 4), so that there is no possibility of the wire electrode 32 and the workpiece table bottom surface 4 interfering with each other. In this case, therefore, the workpiece table bottom surface 4 may be excluded from the group of surfaces to be checked for interference. If a distance 46 of a top height 31a of the lower nozzle 31 from the workpiece table top surface 3 is within a predetermined distance (e.g., 1 mm), moreover, the workpiece table top surface 3 may be excluded from the group of surfaces to be checked for interference. This is because the wire electrode 32 never interferes with the workpiece table top surface 3 due to the size of the lower nozzle 31. If the jig 6 is not used to secure the workpiece 5 to the workpiece table 7, furthermore, the jig 6 and the wire electrode 32 need not be checked for mutual interference.

Figure 2:
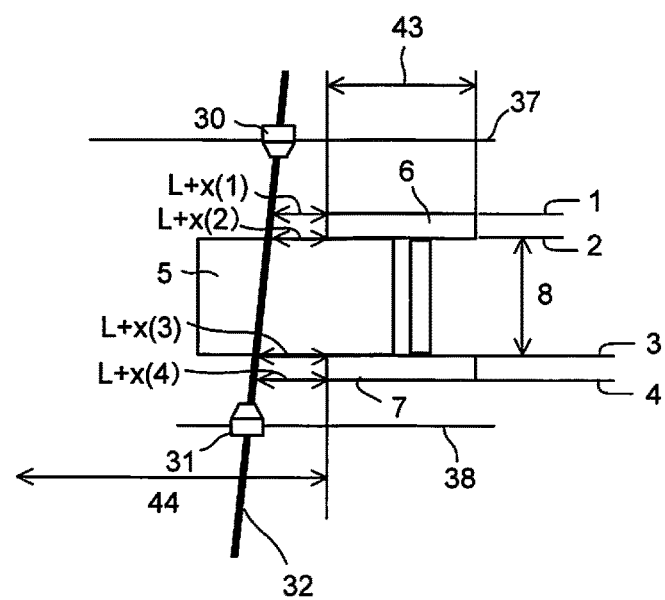
FIG. 2 is a diagram showing distances from a wire electrode to objects to be checked for interference (or collision) on individual surfaces to be checked.

FIG. 2 is a diagram showing distances from the wire electrode to the objects to be checked for interference (or collision) on the individual surfaces to be checked.

The distances from the wire electrode 32 to the jig 6 and the workpiece table 7 are calculated for the individual regions including the jig top surface 1, jig bottom surface 2, workpiece table top surface (workpiece bottom surface) 3, and workpiece table bottom surface 4. The distances ("distance" will be defined later) from the wire electrode 32 to the jig top surface 1, jig bottom surface 2, workpiece table top surface 3, and workpiece table bottom surface 4 are calculated individually for four directions, +X direction, −X direction, +Y direction, and −Y direction. The +X direction and the −X direction orthogonally intersect the +Y direction and the −Y direction, respectively, on the workpiece table top surface 3.

The distances from the wire electrode 32 to the jig top surface 1, jig bottom surface 2, workpiece table top surface 3, and workpiece table bottom surface 4 in the +X direction are designated by $L_{+x(1)}$, $L_{+x(2)}$, $L_{+x(3)}$ and $L_{+x(4)}$, respectively.

The distances from the wire electrode 32 to the jig top surface 1, jig bottom surface 2, workpiece table top surface 3, and workpiece table bottom surface 4 in the −X direction are designated by $L_{-x(1)}$, $L_{-x(2)}$, $L_{-x(3)}$ and $L_{-x(4)}$, respectively.

The distances from the wire electrode 32 to the jig top surface 1, jig bottom surface 2, workpiece table top surface 3, and workpiece table bottom surface 4 in the +Y direction are designated by $L_{+y(1)}$, $L_{+y(2)}$, $L_{+y(3)}$ and $L_{+y(4)}$, respectively.

The distances from the wire electrode 32 to the jig top surface 1, jig bottom surface 2, workpiece table top surface 3, and workpiece table bottom surface 4 in the −Y direction are designated by $L_{-y(1)}$, $L_{-y(2)}$, $L_{-y(3)}$ and $L_{-y(4)}$, respectively.

Figure 3:
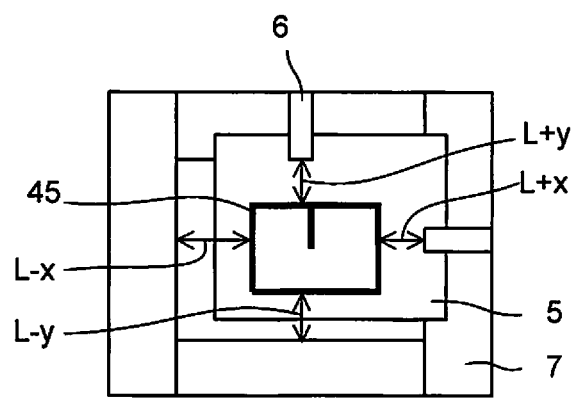
FIG. 3 is a diagram showing distances between the wire electrode and the jig or the workpiece table in individual directions as viewed from above.

FIG. 3 is a diagram showing distances between the wire electrode and the jig or the workpiece table in the individual directions as viewed from above.

The minimum of the distances $L_{+x(1)}$, $L_{+x(2)}$, $L_{+x(3)}$ and $L_{+x(4)}$ from the wire electrode 32 to the jig top surface 1, jig bottom surface 2, workpiece table top surface 3, and workpiece table bottom surface 4 in the +X direction is designated by $L_{+x}$.

The minimum of the distances $L_{-x(1)}$, $L_{-x(2)}$, $L_{-x(3)}$ and $L_{-x(4)}$ from the wire electrode 32 to the jig top surface 1, jig bottom surface 2, workpiece table top surface 3, and workpiece table bottom surface 4 in the −X direction is designated by $L_{-x}$.

The minimum of the distances $L_{+y(1)}$, $L_{+y(2)}$, $L_{+y(3)}$ and $L_{+y(4)}$ from the wire electrode 32 to the jig top surface 1, jig bottom surface 2, workpiece table top surface 3, and workpiece table bottom surface 4 in the +Y direction is designated by $L_{+y}$.

The minimum of the distances $L_{-y(1)}$, $L_{-y(2)}$, $L_{-y(3)}$ and $L_{-y(4)}$ from the wire electrode 32 to the jig top surface 1, jig bottom surface 2, workpiece table top surface 3, and workpiece table bottom surface 4 in the −Y direction is designated by $L_{-y}$.

The position of a machining path 45 of the wire electrode 32 can be reviewed by obtaining the distances $L_{+x}$, $L_{-x}$, $L_{+y}$, and $L_{-y}$ in the four directions (+X direction, −X direction, +Y direction, and −Y direction). Thereupon, the operating range of the machine can be used effectively.

The distances from the wire electrode 32 to the jig top surface 1, jig bottom surface 2, workpiece table top surface 3, and workpiece table bottom surface 4 in each of the four directions (+X direction, −X direction, +Y direction, and −Y direction) are the minimums of the distances from the wire electrode 32 to the respective end portions of the individual regions including the jig top surface 1, jig bottom surface 2, workpiece table top surface (workpiece bottom surface) 3, and workpiece table bottom surface 4. Normally, the jig 6 and the workpiece table 7 are rectangular, so that the distances from the wire electrode 32 to each individual surface (the jig top surface 1, jig bottom surface 2, workpiece table top surface 3, and workpiece table bottom surface 4) can be easily calculated as a length of one of the lines connecting the wire electrode 32 and each of two corner portions of a side of the each individual surface opposite the wire electrode 32, which is the shorter.

Figure 5:
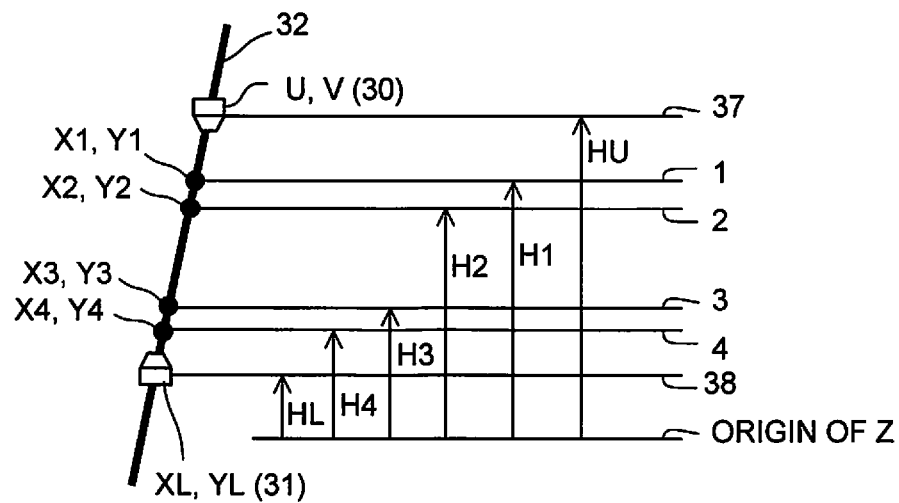
FIG. 5 is a diagram illustrating how to calculate wire electrode positions at the heights of the surfaces to be checked for interference (or collision)

FIG. 5 is a diagram illustrating how to calculate wire electrode positions at the heights of the surfaces to be checked for interference (or collision).

The positions of the wire electrode 32 on each individual surface are calculated based on a position UV of the upper nozzle 30, position XY of the lower nozzle 31, height HL of the lower nozzle 31, and heights H1, H2, H3 and H4 of the jig top surface 1, jig bottom surface 2, workpiece table top surface 3, and workpiece table bottom surface 4. The position of the upper nozzle 30 on the upper guide plane 37 is represented by (U, V). The height above the origin of Z is represented by HU.

The position and height of the wire electrode 32 on a plane at the same height as the jig top surface 1 are represented by (X1, Y1) and H1, respectively. The position and height of the wire electrode 32 on a plane at the same height as the jig bottom surface 2 are represented by (X2, Y2) and H2, respectively. The position and height of the wire electrode 32 on a plane at the same height as the workpiece table top surface 3 are represented by (X3, Y3) and H3, respectively. The position and height of the wire electrode 32 on a plane at the same height as the workpiece table bottom surface 4 are represented by (X4, Y4) and H4, respectively. The position and height of the lower nozzle 31 on the lower guide plane 38 are represented by (XL, YL) and HL, respectively.

The positions (X1, Y1), (X2, Y2), (X3, Y3), and (X4, Y4) of the wire electrode 32 on the individual surfaces are calculated based on the position (U, V) of the upper nozzle 30 on the upper guide plane 37, position (XL, YL) of the lower nozzle 31 on the lower guide plane 38, height HU of the upper nozzle 30, and heights H1, H2, H3 and H4 of the jig top surface 1, jig bottom surface 2, workpiece table top surface 3, and workpiece table bottom surface 4.

In performing wire electric discharge machining on the workpiece 5, a discharge gap is formed between the wire electrode 32 and the workpiece 5. A machining error occurs if the discharge gap overlaps the regions in individual surfaces of the jig 6 or the workpiece table 7. Therefore, it is advisable to check the interference after compensating the diameter of the wire electrode 32.

Figure 6:
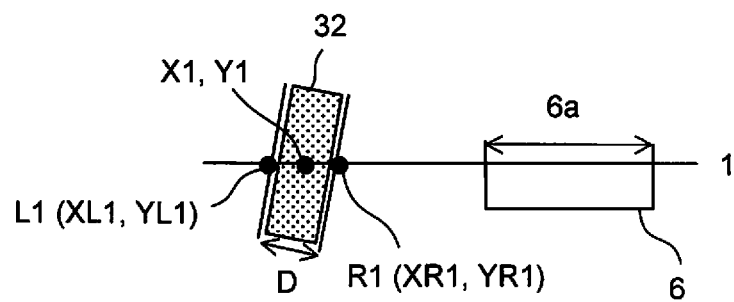
FIG. 6 is a diagram showing how to compensate the wire electrode diameter based on a discharge gap amount.

FIG. 6 is a diagram showing how to compensate the wire electrode diameter based on a discharge gap amount.

The sum total of the diameter of the wire electrode 32 and the discharge gap amount is set to be a wire diameter compensation value. For the interference check on the jig top surface 1, for example, the positions of points R1 (XR1, YR1) and L1 (XL1, YL1) at the right and left ends of a machining region on the jig top surface 1 can be calculated based on the position (X1, Y1) of the wire electrode 32, a wire diameter compensation amount D, and the inclination of the wire electrode 32. If the calculated points R1 and L1 are within the region of the jig 6, it can be determined that there is interference.

Figure 7:
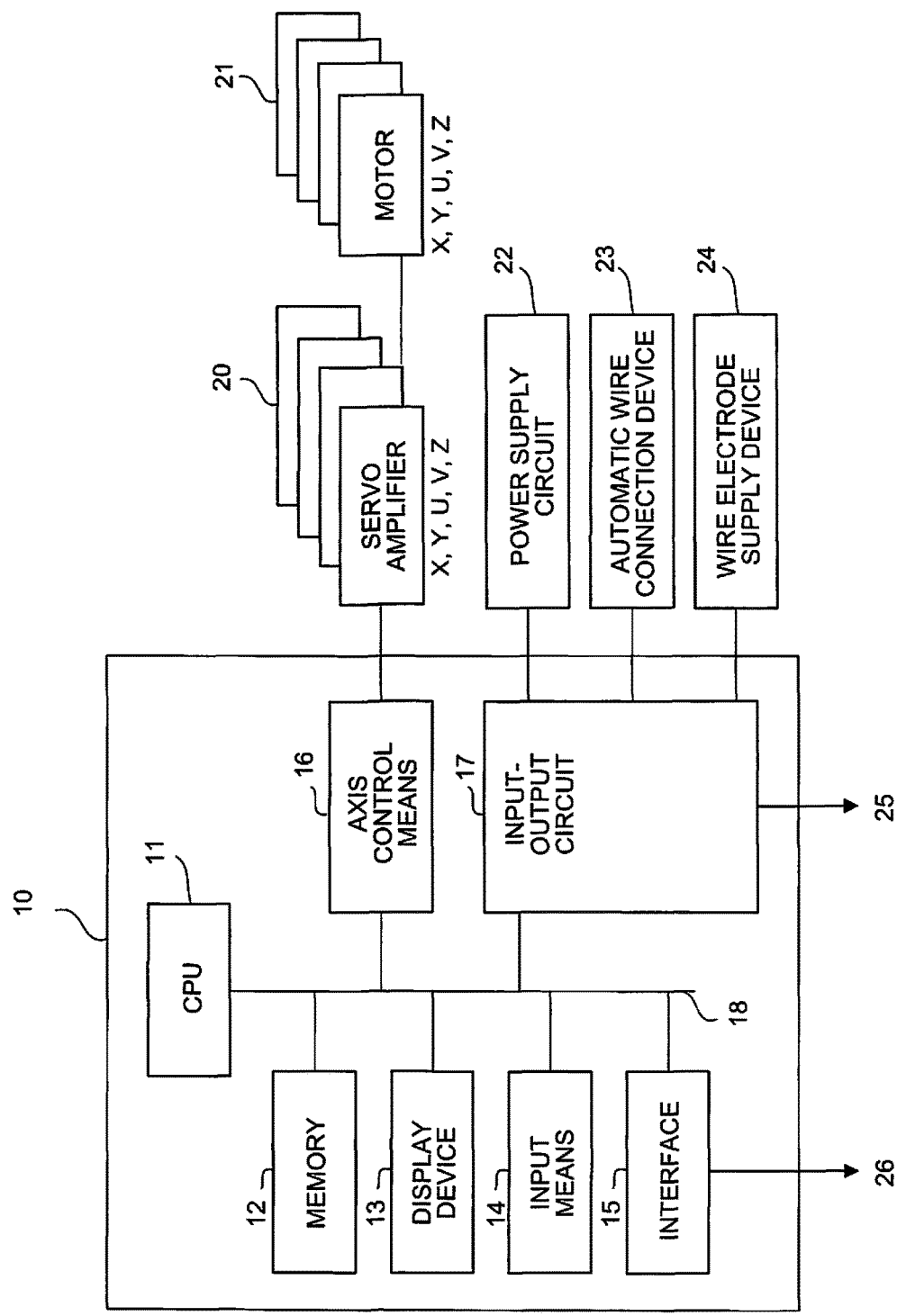
FIG. 7 is a schematic block diagram of a wire electric discharge machine controlled by a controller.

FIG. 7 is a schematic block diagram of the wire electric discharge machine controlled by a controller. A controller 10 for the wire electric discharge machine comprises a processor (CPU) 11, and memory 12 formed of a ROM, RAM, etc., display device 13 such as a liquid crystal display, input means 14 formed of a keyboard or a control panel, and axis control means 16 for controlling X-, Y-, Z-, U-, and V-axes, which are connected to the processor 11 through an interface 18. Each axis control means 16 outputs a command for driving a servomotor 21 for each corresponding axis to a servo amplifier 20 for each corresponding axis. Further, the controller 10 comprises an input-output circuit 17 for commanding a power supply circuit 22, automatic wire connection device 23, and wire electrode supply device 24.

Figure 8A:
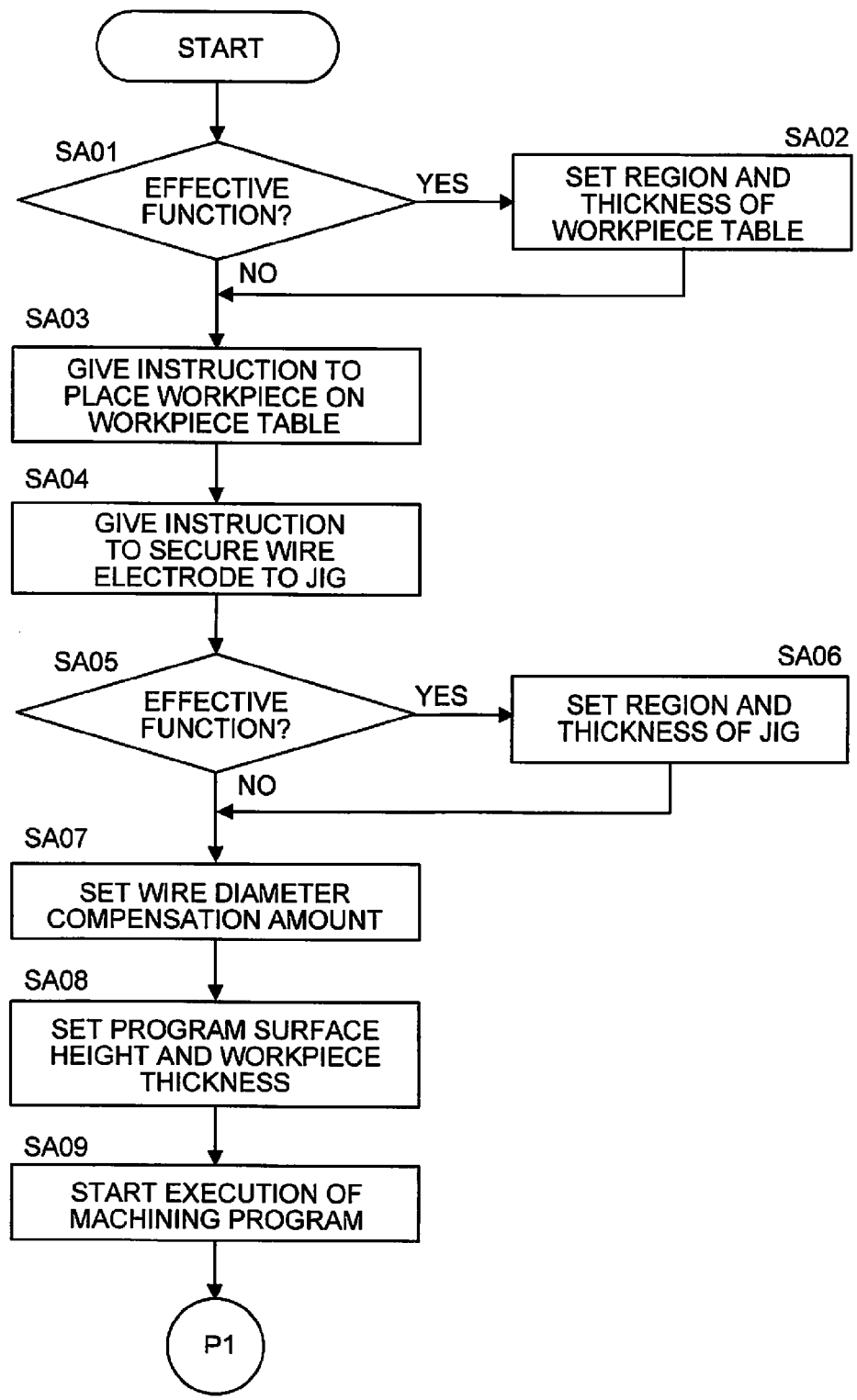
FIGS. 8A and 8B are flowcharts showing processing for making an interference (or collision) check during actual machining.
Figure 8B:
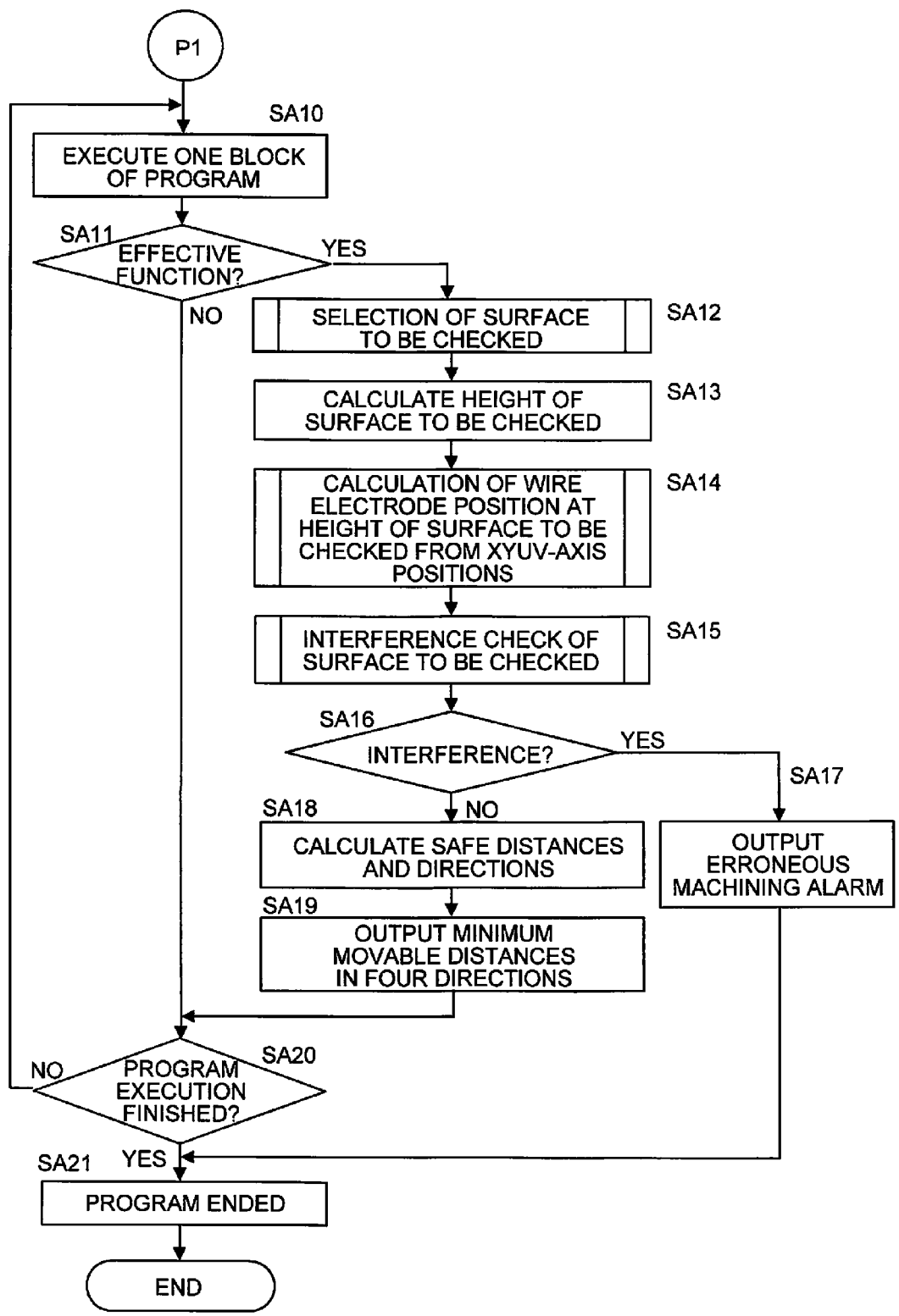

FIGS. 8A and 8B are flowcharts showing processing for making an interference (or collision) check during actual machining. The following is a sequential description of steps in this flowchart.

[Step SA01] It is determined whether or not the present function is effective. If the function is effective (YES), the processing proceeds to Step SA02. If not (NO), the processing proceeds to Step SA03.

[Step SA02] The region and thickness of the workpiece table are set, e.g., by a setting unit, whereupon the processing proceeds to Step SA03. Data on the region and thickness of the workpiece table can be previously stored in the memory 12 by using the input means 14.

[Step SA03] Instruction to place the workpiece on the workpiece table is given.

[Step SA04] Instruction to secure the workpiece by the jig is given.

[Step SA05] It is determined whether or not the present function is effective. If the function is effective (YES), the processing proceeds to Step SA06. If not (NO), the processing proceeds to Step SA07.

[Step SA06] The region and thickness of the jig are set, whereupon the processing proceeds to Step SA07. Data on the region and thickness of the jig can be previously stored in the memory 12 by using the input means 14.

[Step SA07] A wire diameter compensation amount is set.

[Step SA08] A program surface height and a workpiece thickness are set. These values may be set by using parameters previously stored in the controller or set in a program.

[Step SA09] Execution of a machining program is started.

[Step SA10] One block of the program is read and executed.

[Step SA11] It is determined whether or not the present function is effective. If the function is effective (YES), the processing proceeds to Step SA12. If not (NO), the processing proceeds to Step SA20.

[Step SA12] Selection of a surface to be checked is executed.

[Step SA13] The height of the surface to be checked is calculated.

[Step SA14] The position of the wire electrode at the height of the surface to be checked is calculated, e.g., by a wire electrode position calculation section.

[Step SA15] Interference between the wire electrode and the surface to be checked is checked.

[Step SA16] It is determined, e.g., by an interference determination unit, whether or not there is interference between the wire electrode and the surface to be checked. If there is the interference (YES), the processing proceeds to Step SA17. If not (NO), the processing proceeds to Step SA18.

[Step SA17] An alarm indicative of the occurrence of erroneous machining is output, whereupon the processing proceeds to Step SA21.

[Step SA18] Safe distances and directions are calculated. In this case, the distances between the wire electrode and the objects to be checked are obtained.

[Step SA19] Minimum movable distances in the four directions (+X, −X, +Y, and −Y directions) are output, e.g., by a distance output unit. In this case, the minimum distances for the four directions, out of the distances from the objects of interference obtained for the individual blocks of the machining program in Step SA18, and their directions are obtained. The position of the machining path can be reviewed based on these data.

[Step SA20] It is determined whether or not the execution of the program is finished. If the execution is not finished (NO), the processing proceeds to Step SA10. If the execution is finished (YES), the processing proceeds to Step SA21.

[Step SA21] Program termination processing is performed, whereupon the electric discharge machining ends. The program termination processing includes power shutdown and the like.

Figure 9:
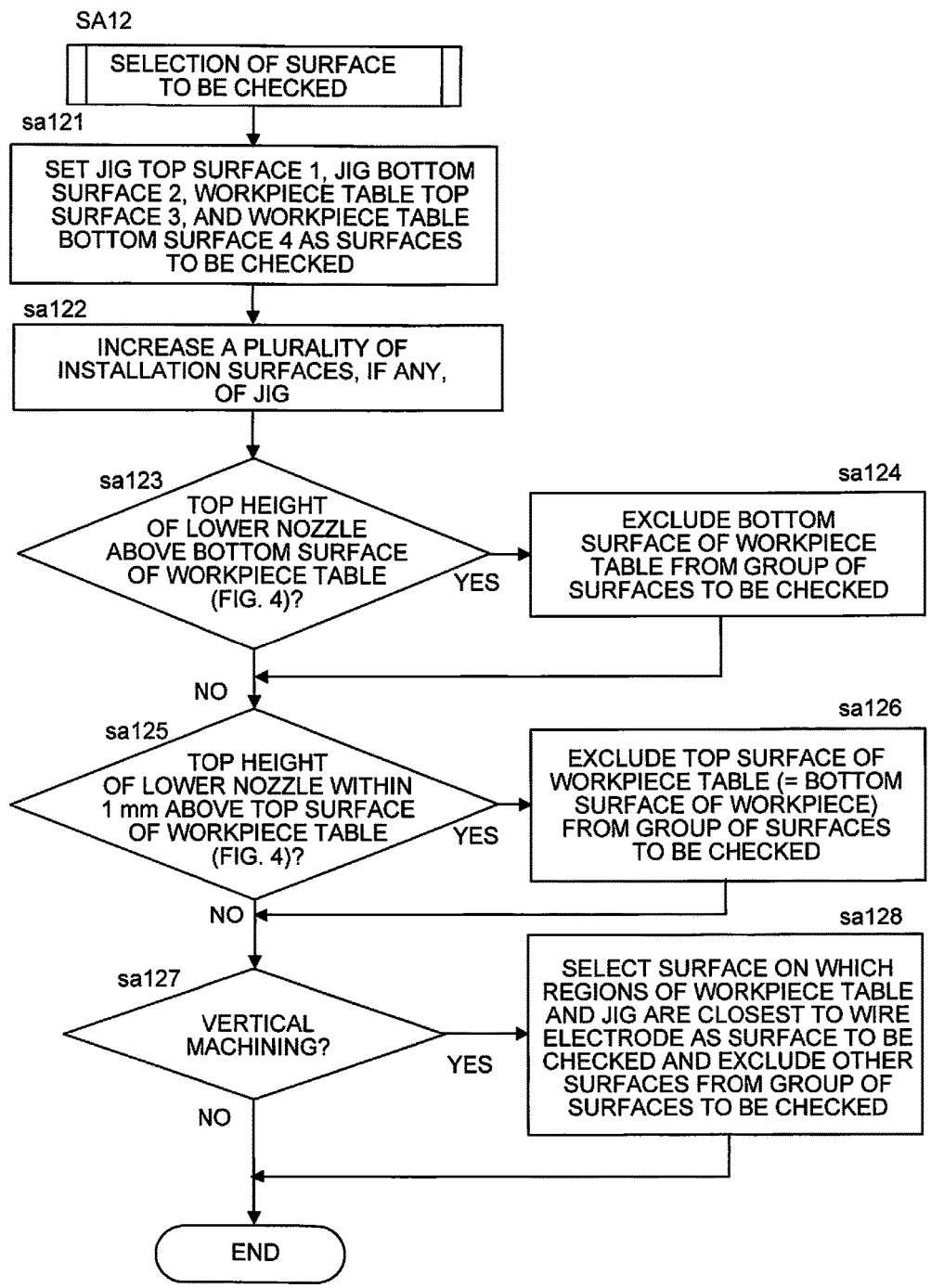
FIG. 9 is a flowchart showing processing for selecting the surfaces to be checked.

FIG. 9 is a flowchart showing processing for selecting the surfaces to be checked in the processing of Step SA12 of FIG. 8B. The following is a sequential description of steps in this flowchart.

[Step sa121] The jig top surface 1, jig bottom surface 2, workpiece table top surface 3, and workpiece table bottom surface 4 are set as surfaces to be checked.

[Step sa122] If the jig has a plurality of installation surfaces, the surfaces are increased. If the jig does not have a plurality of installation surfaces, processing of this step is not performed.

[Step sa123] It is determined whether or not the top height of the lower nozzle is above the bottom surface of the workpiece table. If the top height is above the bottom surface of the workpiece table (YES), the processing proceeds to Step sa124. If not (NO), the processing proceeds to Step sa125.

[Step sa124] The bottom surface of the workpiece table is excluded from the group of surfaces to be checked, whereupon the processing proceeds to Step sa125.

[Step sa125] It is determined whether or not the top height of the lower nozzle is within 1 mm above the top surface of the workpiece table. If the top height is within 1 mm (YES), the processing proceeds to Step sa126. If not (NO), the processing proceeds to Step sa127.

[Step sa126] The top surface of the workpiece table is excluded from the group of surfaces to be checked, whereupon the processing proceeds to Step sa127.

[Step sa127] It is determined whether or not the machining is vertical machining. If the machining is vertical machining (YES), the processing proceeds to Step sa128. If not (NO), the processing for selecting the surface to be checked ends.

[Step sa128] The surface on which the regions of the workpiece table and the jig are closest to the wire electrode is selected as the surface to be checked, and the other surfaces are excluded from the group of surfaces to be checked. Thereupon, the processing for selecting the surface to be checked ends.

The following is a description of processing performed by a personal computer having the function of virtually performing electric discharge machining by the wire electric discharge machine or a controller having the function of virtually executing the machining program of the wire electric discharge machine. Such a personal computer or controller comprises a processor (e.g., the CPU 11 of the controller 10) configured as the interference determination unit, the wire electrode position calculation section, the setting unit and the distance output unit as described herein.

Figure 10A:
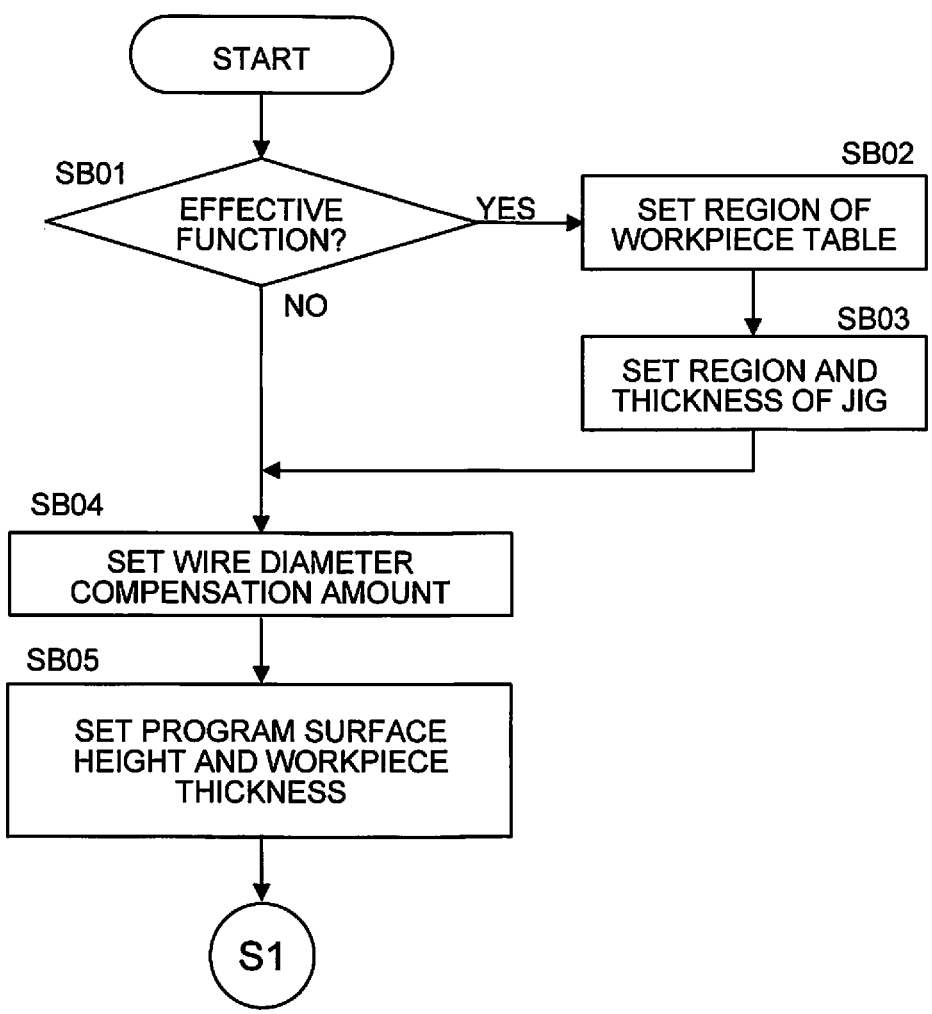
FIGS. 10A to 10C are flowcharts showing processing for making an interference (or collision) check during check drawing.
Figure 10B:
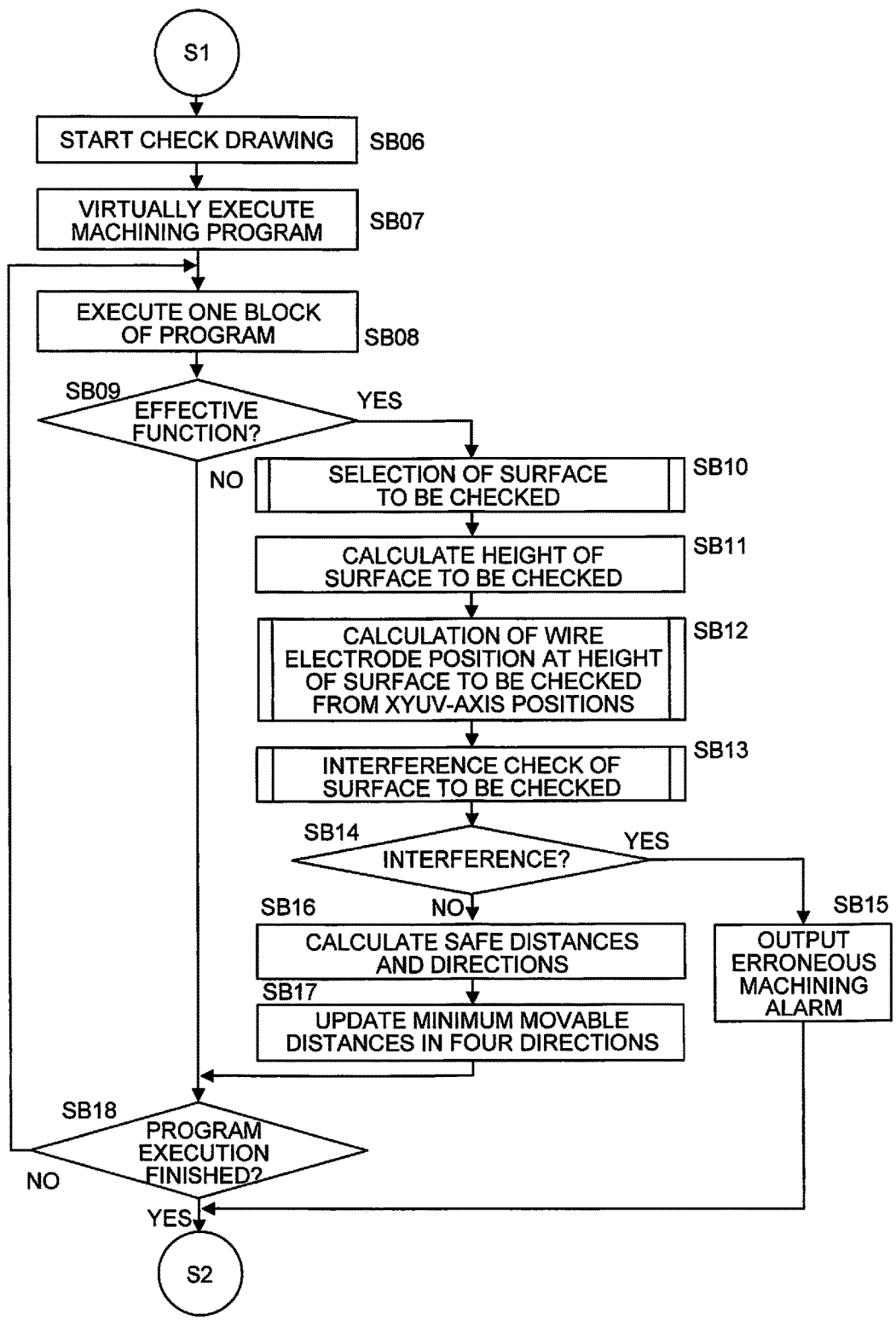
Figure 10C:
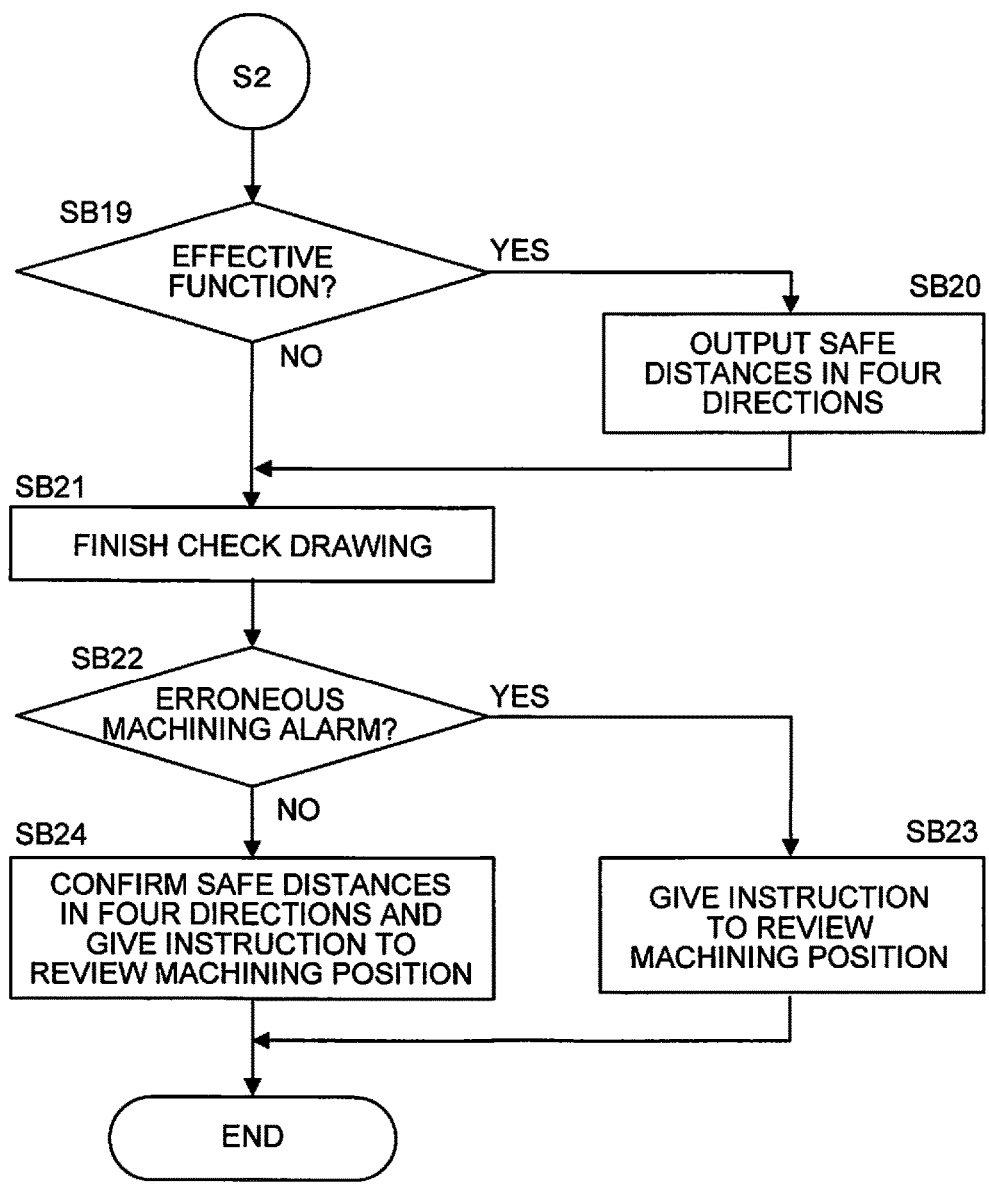

FIGS. 10A, 10B and 10C are flowcharts showing processing for making an interference (or collision) check during check drawing.

[Step SB01] It is determined whether or not the present function is effective. If the function is effective (YES), the processing proceeds to Step SB02. If not (NO), the processing proceeds to Step SB04.

[Step SB02] The region and thickness of the workpiece table are set, e.g., by the setting unit, whereupon the processing proceeds to Step SB03. Data on the region and thickness of the workpiece table can be previously stored in the memory 12 by using the input means 14.

[Step SB03] The region and thickness of the jig are set, whereupon the processing proceeds to Step SB04. Data on the jig can be previously stored in the memory 12 by using the input means 14.

[Step SB04] A wire diameter compensation amount is set.

[Step SB05] A program surface height and a workpiece thickness are set. These values may be set by using parameters previously stored in the controller or set in a program.

[Step SB06] Check drawing is started.

[Step SB07] Virtual execution of the machining program is started.

[Step SB08] One block of the program is read and its execution is started.

[Step SB09] It is determined whether or not the present function is effective. If the function is effective (YES), the processing proceeds to Step SB10. If not (NO), the processing proceeds to Step SB18.

[Step SB10] Selection of a surface to be checked is executed.

[Step SB11] The height of the surface to be checked is calculated.

[Step SB12] The position of the wire electrode at the height of the surface to be checked is calculated, e.g., by the wire electrode position calculation section.

[Step SB13] Interference between the wire electrode and the surface to be checked is checked.

[Step SB14] It is determined, e.g., by the interference determination unit, whether or not there is interference between the wire electrode and the surface to be checked. If there is the interference (YES), the processing proceeds to Step SB15. If not (NO), the processing proceeds to Step SB16.

[Step SB15] An alarm indicative of the occurrence of erroneous machining is output, whereupon this processing ends.

[Step SB16] Safe distances and directions are calculated.

[Step SB17] Minimum movable distances in the four directions are updated, e.g., by the distance output unit. In Step SB17, the minimum distances for the four directions (+X, −X, +Y, and −Y directions), out of the distances from the objects of interference obtained for the individual blocks of the machining program in Step SB16, and their directions are updated.

[Step SB18] It is determined whether or not the execution of the program is finished. If the execution is not finished (NO), the processing proceeds to Step SB08. If the execution is finished (YES), the processing proceeds to Step SB19.

[Step SB19] It is determined whether or not the present function is effective. If the function is effective (YES), the processing proceeds to Step SB20. If not (NO), the processing proceeds to Step SB21.

[Step SB20] The data obtained in Step SB17, that is, the safe distances in the four directions, are output.

[Step SB21] The check drawing is finished.

[Step SB22] It is determined whether or not an erroneous machining alarm is issued. If the erroneous machining alarm is issued (YES), the processing proceeds to Step SB23. If not (NO), the processing proceeds to Step SB24.

[Step SB23] Instruction to review the machining position is given.

[Step SB24] The safe distances in the four directions are confirmed and instruction to review the machining position is given, whereupon the processing ends.

According to the embodiment of the present invention described above, erroneous machining of the workpiece table and/or the jig can be prevented during machining. The wire electrode positions on the surfaces to be checked are calculated and it is checked to see if the wire electrode is within the regions of the jig and the workpiece table. Therefore, the check can be made in real time with a smaller calculation load than in a three-dimensional interference check. Thus, new solid data on the wire electrode need not be defined for the interference check. The occurrence of erroneous machining can be ascertained during the check drawing in virtually executing the machining program. Thus, interruptions during machining are reduced, so that the machining time can be reduced. According to the present invention, moreover, machining can be performed in a wider range than in the prior art, so that the operating range of the machine can be used effectively.

The invention claimed is:

1. A wire electric discharge machine, comprising:
a workpiece table;
upper and lower wire guides;
a wire electrode supported by the upper and lower wire guides, wherein the wire electric discharge machine is configured to perform electric discharge machining on a workpiece by relatively moving the workpiece placed on the workpiece table and the wire electrode supported by the upper and lower wire guides according to a machining program; and
a processor configured to determine whether or not the top or bottom surface of the workpiece table interferes with the wire electrode at the height of the surface during the execution of the machining program.

2. The wire electric discharge machine according to claim 1, wherein
the processor is configured to calculate a position of the wire electrode on a plane at the height of the surface to be checked for interference with the wire electrode.

3. The wire electric discharge machine according to claim 1, further comprising:
a jig configured to secure the workpiece to the workpiece table,
wherein the processor is configured to determine whether or not the top or bottom surface of the jig, in addition to the top or bottom surface of the workpiece table, interferes with the wire electrode at the height of the top or bottom surface of the jig during the execution of the machining program.

4. The wire electric discharge machine according to claim 3, further comprising:
a memory storing therein settings for a region and a thickness of the jig for securing the workpiece to the workpiece table.

5. The wire electric discharge machine according to claim 3, wherein
the processor is configured to output minimums of distances from the wire electrode to the workpiece table and the jig in four directions including positive and negative first directions and positive and negative second directions perpendicular to the first directions.

6. The wire electric discharge machine according to claim 1, wherein the processor is configured to select one of the surfaces to be checked for interference with the wire electrode.

7. The wire electric discharge machine according to claim 1, further comprising:
a memory storing therein settings for a region and a thickness of the workpiece table.

8. The wire electric discharge machine according to claim 1, wherein
the processor is configured to output minimums of distances between the wire electrode and the workpiece table in four directions including positive and negative first directions and positive and negative second directions perpendicular to the first directions.

9. The wire electric discharge machine according to claim 1, wherein
the processor is configured to stop the electric discharge machining in response to a determination that the top or bottom surface of the workpiece table interferes with the wire electrode at the height of the surface during the execution of the machining program.

10. An arithmetic device configured to virtually execute a machining program for causing a wire electric discharge machine, which comprises a workpiece table, upper and lower wire guides, and a wire electrode supported by the upper and lower wire guides, to perform electric discharge machining on a workpiece by relatively moving the workpiece placed on the workpiece table and the wire electrode supported by the upper and lower wire guides, the arithmetic device comprising:
a processor configured to determine whether or not the top or bottom surface of the workpiece table interferes with the wire electrode at the height of the surface during the virtual execution of the machining program.

11. The arithmetic device according to claim 10, wherein
the processor is configured to calculate a position of the wire electrode on a plane at the height of the surface to be checked for interference with the wire electrode.

12. The arithmetic device according to claim 10, further comprising:
a memory storing therein settings for a region and a thickness of the workpiece table.

13. The arithmetic device according to claim 10, wherein
the processor is configured to output minimums of distances between the wire electrode and the workpiece table in four directions including positive and negative first directions and positive and negative second directions perpendicular to the first directions.

14. The arithmetic device according to claim 10, wherein
the wire electric discharge machine further comprises a
jig configured to secure the workpiece to the workpiece
table, and the processor is configured to determine whether or not the top or bottom surface of the jig, in addition to the top or bottom surface of the workpiece table, interferes with the wire electrode at the height of the top or bottom surface of the jig during the virtual execution of the machining program.

15. The arithmetic device according to claim 14, further comprising:

a memory storing therein settings for a region and a thickness of the jig for securing the workpiece to the workpiece table.

16. The arithmetic device according to claim 14, wherein the processor is configured to output minimums of distances from the wire electrode to the workpiece table and the jig in four directions including positive and negative first directions and positive and negative second directions perpendicular to the first directions.

17. The arithmetic device according to claim 14, wherein the processor is configured to select one of the surfaces to be checked for interference with the wire electrode.

* * * * *